(12) United States Patent
Mota et al.

(10) Patent No.: US 8,897,433 B2
(45) Date of Patent: Nov. 25, 2014

(54) SECURITY SYSTEM WITH TWO-WAY COMMUNICATION AND VIDEO

(75) Inventors: Iwan Mota, Toronto (CA); Joel Matlin, Toronto (CA)

(73) Assignee: Alarmforce Industries Inc., Toronto, ON (CA)

( * ) Notice: Subject to any disclaimer, the term of this patent is extended or adjusted under 35 U.S.C. 154(b) by 1029 days.

(21) Appl. No.: 12/658,082

(22) Filed: Feb. 2, 2010

(65) Prior Publication Data

US 2010/0195810 A1  Aug. 5, 2010

Related U.S. Application Data

(60) Provisional application No. 61/149,215, filed on Feb. 2, 2009.

(51) Int. Cl.
   *H04M 1/60* (2006.01)
   *H04M 11/04* (2006.01)
   *H04N 7/18* (2006.01)

(52) U.S. Cl.
   CPC .................................... *H04N 7/186* (2013.01)
   USPC .................... 379/167.11; 379/39; 379/167.12

(58) Field of Classification Search
   USPC ............................................ 379/167.05–173
   See application file for complete search history.

(56) References Cited

U.S. PATENT DOCUMENTS

| 5,237,408 | A | | 8/1993 | Blum et al. | |
|---|---|---|---|---|---|
| 6,049,598 | A | * | 4/2000 | Peters et al. | 379/102.06 |
| 7,193,644 | B2 | * | 3/2007 | Carter | 348/14.06 |
| 7,746,223 | B2 | * | 6/2010 | Howarter et al. | 340/506 |
| 8,144,184 | B2 | * | 3/2012 | Carter | 348/14.06 |
| 8,154,581 | B2 | * | 4/2012 | Carter | 348/14.06 |
| 8,164,614 | B2 | * | 4/2012 | Carter | 348/14.06 |
| 2004/0170262 | A1 | * | 9/2004 | Ohno | 379/167.12 |
| 2008/0007621 | A1 | * | 1/2008 | Ying et al. | 348/156 |
| 2008/0068150 | A1 | * | 3/2008 | Nguyen et al. | 340/506 |
| 2008/0069326 | A1 | * | 3/2008 | Chang | 379/167.11 |

FOREIGN PATENT DOCUMENTS

CA   2691774   8/2010

OTHER PUBLICATIONS

Aug. 28, 2012 Response to Examination Report dated May 28, 2012.
Examination Report dated Jan. 9, 2013.
Feb. 13, 2013 Response to Examination Report dated Jan. 9, 2013.
Canadian Examination Report on 2,691,774 dated Mar. 20, 2013.

* cited by examiner

*Primary Examiner* — Joseph T Phan
(74) *Attorney, Agent, or Firm* — Dunlap Codding, P.C.

(57) ABSTRACT

A security system has a camera; a sensor generating a signal in response to a triggering event, and a management module. The triggering event is one of an actuation of a doorbell button, an actuation of a bell connected to and operated by a doorbell button, door opening detection, motion detection, proximity detection and infrared (IR) beam interruption. The management module is adapted to send data to be received by a remote communication device upon generation by the sensor of the signal generated in response to the triggering event. The management module is also adapted to initiate a connection between the remote communication device and the camera, the connection permitting data exchange between the remote communication device and the camera. The security system allows a person located in a vicinity of the camera installed at a building or a house to communicate with a user of a remote communication device.

18 Claims, 6 Drawing Sheets

SECURITY SYSTEM WITH TWO-WAY COMMUNICATION AND VIDEO

CROSS-REFERENCE TO RELATED APPLICATIONS

The present application claims priority to U.S. Provisional Patent Application No. 61/149,215 filed Feb. 2, 2009, the entire contents of which is incorporated herein by reference.

FIELD OF THE PRESENTLY DISCLOSED AND CLAIMED INVENTIVE CONCEPT(S)

The presently disclosed and claimed inventive concept(s) relates to a security system providing a two-way communication channel between a remote communication device and a camera.

BACKGROUND OF THE PRESENTLY DISCLOSED AND CLAIMED INVENTIVE CONCEPT(S)

Many houses and buildings are provided with intercom systems to permit communication between a person outside the house or building and a person inside the house or building. These systems usually consist of at least two units each comprising a microphone and a speaker to allow communication between the units. Some systems are also provided with one or more cameras and monitors to allow images or videos to be transmitted to the person inside the house or building.

One of the drawbacks of such systems is that the person must be inside the house or building in proximity to one of the intercom units in order to be able to communicate with the person outside the house or building. In the event that nobody is in the house or building or near one of the intercom units, no communication with the person outside the house or building is possible and the owner/occupant of the house or building will likely be unaware that someone came to the house or building.

Another drawback is that the installation of such systems can be complicated and often requires skilled technicians to make the installation.

Also, the installation of these intercom systems can result in two different devices that can be used by a person standing outside the house or building: a doorbell button (which was present prior to the installation of the intercom system) and the intercom unit. Since people are more used to using doorbell buttons, it is likely that a person would use the doorbell button instead of the intercom unit, and therefore the intercom system does not get used.

Therefore there is a need for a security system that allows for communication with a person outside a house or building even if no one is in the house or building.

There is also a need for a security system that can be easily installed on a house or building.

There is a need for a security system that does not result in two different devices that can be actuated by a person standing outside a house or building to operate the security system.

SUMMARY OF THE PRESENTLY DISCLOSED AND CLAIMED INVENTIVE CONCEPT(S)

It is an object of the presently disclosed and claimed inventive concept(s) to ameliorate at least some of the inconveniences present in the prior art.

It is another object of the presently disclosed and claimed inventive concept(s) to allow a person located in a vicinity of a camera installed at a building or a house to communicate with a user of a remote communication device.

It is another object of the presently disclosed and claimed inventive concept(s) to provide a security system that can be easily installed.

It is another object of the presently disclosed and claimed inventive concept(s) to provide a security system that does not result in two different devices that can be actuated by a person standing outside or inside a house or building to operate the security system.

In one aspect, the presently disclosed and claimed inventive concept(s) provides a security system having a camera, a sensor generating a signal in response to a triggering event, and a management module. The triggering event is one of an actuation of a doorbell button, an actuation of a bell connected to and operated by a doorbell button, door opening detection, sound detection, motion detection, proximity detection and infrared (IR) beam interruption. The management module is adapted to send data to be received by a remote communication device upon generation by the sensor of the signal generated in response to the triggering event. The management module is also adapted to initiate a connection between the at least one remote communication device and the camera, the connection permitting data exchange between the at least one remote communication device and the camera.

In an additional aspect of the presently disclosed and claimed inventive concept(s), the camera and the sensor are a common device providing a motion detection module. The motion detection module triggers motion detection and proximity detection.

In a further aspect of the presently disclosed and claimed inventive concept(s), the data sent by the management module includes data generated by the camera.

In an additional aspect of the presently disclosed and claimed inventive concept(s), the remote communication device includes a first remote communication device that receives the data sent by the management module upon generation by the sensor of the signal generated in response to the triggering event. The remote communication device also includes a second remote communication device with which the connection permitting data exchange with the camera is initiated. The second remote communication device may be different from the first remote communication device.

In a further aspect of the presently disclosed and claimed inventive concept(s), the sensor is a doorbell button.

In an additional aspect of the presently disclosed and claimed inventive concept(s), the security systems also comprises a receiver module which causes the camera to generate data related to an image of a vicinity of the camera taken by the camera in response to receiving the signal generated by the sensor.

In a further aspect of the presently disclosed and claimed inventive concept(s), the receiver module and the camera are embedded in a common unit.

In an additional aspect of the presently disclosed and claimed inventive concept(s), the data sent by the management module is related to an image of a vicinity of the camera taken by the camera.

In a further aspect of the presently disclosed and claimed inventive concept(s), the camera is a video camera and includes a microphone and a speaker.

In an additional aspect of the presently disclosed and claimed inventive concept(s), the connection initiated between the remote communication device and the video camera allows a user of the remote communication device to communicate with a person who is located in a vicinity of the video camera.

In a further aspect of the presently disclosed and claimed inventive concept(s), the video camera is located at one of a building and a house and the user of the remote communication device is remote from the one of the building and the house.

In an additional aspect of the presently disclosed and claimed inventive concept(s), the management module is further adapted to store in a database data related to an image of a vicinity of the camera taken by the camera upon receipt of the signal from the sensor.

In a further aspect of the presently disclosed and claimed inventive concept(s), the remote communication device is one of a fixed line telephone, a cellular telephone, a smart phone, and a computer.

In an additional aspect of the presently disclosed and claimed inventive concept(s), the signal generated by the sensor in response to the triggering event is transmitted to one of the management module and the camera wirelessly.

In a further aspect of the presently disclosed and claimed inventive concept(s), the management module initiates the connection between the remote communication device and the camera via one of Internet and a Voice over Internet Protocol (VoIP) call.

In an additional aspect of the presently disclosed and claimed inventive concept(s), the management module initiates the connection between the at least one remote communication device and the camera by dialling at least one predetermined phone number.

In a further aspect of the presently disclosed and claimed inventive concept(s), the management module is accessible to a user via a web interface.

In an additional aspect of the presently disclosed and claimed inventive concept(s), the web interface allows changing a configuration of the management module, modifying the triggering event, requesting a live video session with the camera, requesting a live audio session with the camera, recording audio session with the camera, recording video session with the camera, accessing an image of a vicinity of the camera taken by the camera, arming an alarm control unit, disarming an alarm control unit, requesting a message to be played and accessing data related to actions undertaken by the management module.

In an additional aspect of the presently disclosed and claimed inventive concept(s), the camera includes the management module.

In another aspect, the presently disclosed and claimed inventive concept(s) provides a doorbell system. The doorbell system has a camera, a doorbell button, a bell operated by the doorbell button, a sensor generating a signal in response to actuation of at least one of the doorbell button and the bell, and a management module. The management module is adapted to send data to be received by a remote communication device upon generation by the sensor of the signal generated in response to actuation of at least one of the doorbell button and the bell. The management module is also adapted to initiate a connection between the remote communication device and the camera, the connection permitting data exchange between the remote communication device and the camera.

In another aspect, the presently disclosed and claimed inventive concept(s) provides a doorbell system. The doorbell system has a camera, a doorbell button generating a signal in response to actuation of the doorbell button, and a management module. The management module is adapted to send data to be received by a remote communication device upon generation by the doorbell button of the signal generated in response to actuation of the doorbell button. The management module is also adapted to initiate a connection between the remote communication device and the camera, the connection permitting data exchange between the communication device and the camera.

Embodiments of the presently disclosed and claimed inventive concept(s) each have at least one of the above-mentioned objects and/or aspects, but do not necessarily have all of them. It should be understood that some aspects of the presently disclosed and claimed inventive concept(s) that have resulted from attempting to attain the above-mentioned objects may not satisfy these objects and/or may satisfy other objects not specifically recited herein.

Additional and/or alternative features, aspects, and advantages of embodiments of the presently disclosed and claimed inventive concept(s) will become apparent from the following description, the accompanying drawings, and the appended claims.

BRIEF DESCRIPTION OF THE DRAWINGS

For a better understanding of the presently disclosed and claimed inventive concept(s), as well as other aspects and further features thereof, reference is made to the following description which is to be used in conjunction with the accompanying drawings, where:

Figure 1:
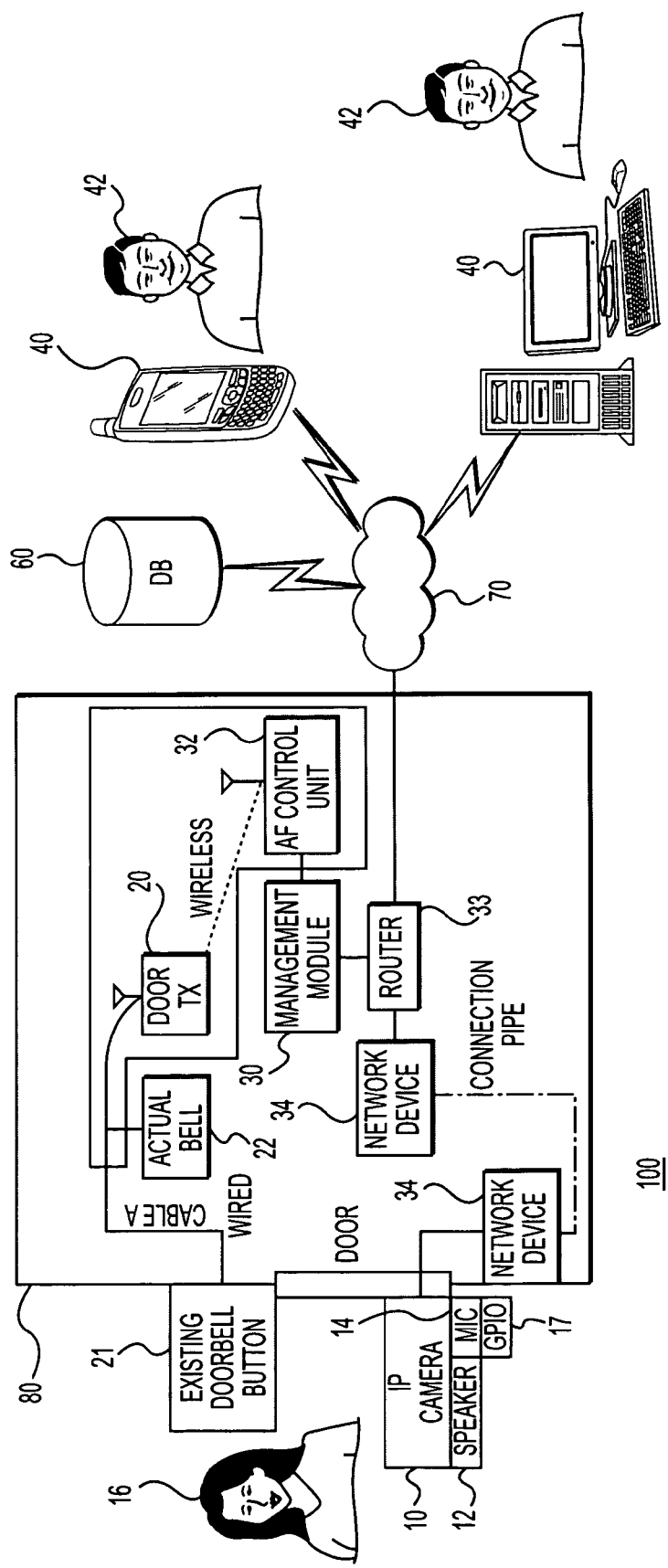
FIG. 1 is a schematic view of a security system in accordance with a first embodiment of the presently disclosed and claimed inventive concept(s)

In the drawings, embodiments of the presently disclosed and claimed inventive concept(s) are illustrated by way of example. It is to be expressly understood that the description and drawings are only for purposes of illustration and as an aid to understanding. They are not intended to be a definition of the limits of the presently disclosed and claimed inventive concept(s).

DETAILED DESCRIPTION OF THE PREFERRED EMBODIMENTS

FIG. 1 illustrates an embodiment of a security system 100 for two-way communication. The security system 100 allows a person 16 located in a vicinity of a video camera 10 installed at a building or a house 80 to communicate with a user 42 of a remote communication device 40. In this embodiment, the video camera 10 is an IP camera that includes a speaker 12, a microphone 14 and a General Purpose Input/Output (GPIO) relay input 17. Although a video camera 10 is depicted, it is contemplated that the video camera 10 can be a camera or any other device able to capture and process images. It is also contemplated that the video camera 10 may include a monitor. Alternatively, a monitor may be disposed in a vicinity of the video camera 10, the monitor allowing display of images to the person 16, for example, display of an image of the user 42 when the connection is established between the remote communication device 40 and the video camera 10.

In this particular embodiment of the presently disclosed and claimed inventive concept(s), it is assumed that an existing doorbell system has a doorbell button 21 and a bell unit 22 with a 2-conductor wire or cable (CABLE A) connecting the doorbell button 21 to the bell unit 22 from which a sound can be heard. A sensor 20, which includes a wireless transmitter, has a dry relay input and is connected in parallel to the 2-conductor wire (CABLE A) in the vicinity of the bell unit 22, where access to the 2-conductor wire or cable is usually easier.

The sensor 20 generates a signal in response to a triggering event, in this embodiment, when the doorbell button 21 is pressed or when the bell unit 22 is actuated. When the doorbell button 21 is pressed the 2-conductor wire or cable (CABLE A) is shorted and the relay on the sensor 20 is tripped, causing the sensor 20 to send a wireless signal to an alarm panel 32. The alarm panel 32 allows the user 42 to arm or disarm an alarm system of the building/house 80 to which the alarm panel 32 is connected. The alarm panel 32 in turn triggers a management module 30 to initiate a connection between the remote communication device 40 of the user 42 and the video camera 10. The connection permits data exchange between the remote communication device 40 and the video camera 10.

The management module 30 can be any implementation of a system being able to communicate with the video camera 10 and the remote communication device 40. Although represented as two different units on FIG. 1, the management module 30 and the alarm panel 32 can be embedded in a common unit. Also, the video camera 10 and the management module 30 can be embedded in a common unit. In addition, it is also contemplated that the wireless signal generated by the sensor 20 can be directly transmitted to the management module 30 without requiring the alarm panel 32 to act as a relay.

A communication channel permitting data exchange between the remote communication device 40 and the video camera 10 is established via a network 70. Examples of suitable network are the Internet, a network compliant with the Voice over Internet Protocol (VoIP) protocol, a standard public or private network, or a telephone network. In the example of a communication being established via a VoIP call, the call is made to a pre-determined speed-dial number (fixed line, cellular phone or other), or multiple numbers in sequence identifying the remote communication device 40 (for example an IP or a MAC address). The call can be made by management module 30.

In addition, when the alarm panel 32 triggers the management module 30 to initiate the connection permitting data exchange between the remote communication device 40 and the video camera 10, the management module 30 requests the video camera 10 to take an image snapshot of its field of view (i.e. its vicinity) through a connection pipe. The connection pipe includes a router 33 connected (wirelessly or not) to the management module 30 and network devices 34 connected to the video camera 10. The connection pipe can also be a wireless connection between the video camera 10 and the management module 30. This image snapshot can be emailed to a pre-determined address or addresses of the user 42, sent to the remote communication device 40, stored for archival purposes in a database 60 with which the management module 30 can be connected to and/or uploaded to an offsite storage facility. It is contemplated that the image snapshot may not be requested by the management module 30 but instead be directly transmitted by the video camera 10 without any specific action from the management module 30. It is contemplated that instead of, or in addition to the image snapshot, that a text message, a short text message (SMS), a short video message, a message compliant with the multimedia messaging service (MMS) protocol or any kind of data that can be understood by the user 42 can be transmitted to the remote communication device 40 as an indication that the person 16 caused the security system 100 to be actuated.

Once the management module 30 sends data to the remote communication device 40 of the user 42, upon generation of the signal by the sensor 20, a connection is initiated and established, for example via a data or voice connection (e.g. via the network 70), between the remote communication device 40 and the video camera 10. Audio and/or video data is transmitted via the established connection. The person 16 located in the vicinity of the video camera 10 can now be heard and hear the user 42. It also contemplated that the user 42 can make the determination as to whether or not he/she establishes the connection. The determination can be based, for example, on the image snapshot received on the remote communication device 40.

The remote communication device 40 of the user 42 can be a cellular phone (or a smart phone) capable of receiving emails with image attachments, in which case the user 42 can receive the image snapshot of the person 16, while or before speaking to the person 16. This aids in determining the identity of the person 16 and result in a richer user experience.

It is also contemplated that the remote communication device 40 of the user 42 may be a non-email enabled phone (e.g. a fixed line phone or a cellular phone), in such a case an SMS alert can be sent, indicating the presence of a person at his/her building or house 80. It is also possible that the user 42 receives an email on a different device from the one being used to talk to the person 16. For example, the user 42 talks to the person 16 on a cellular phone or on landline phone, while at the same time receiving an email on a computer with an image snapshot attached, identifying the person 16.

Figure 2:
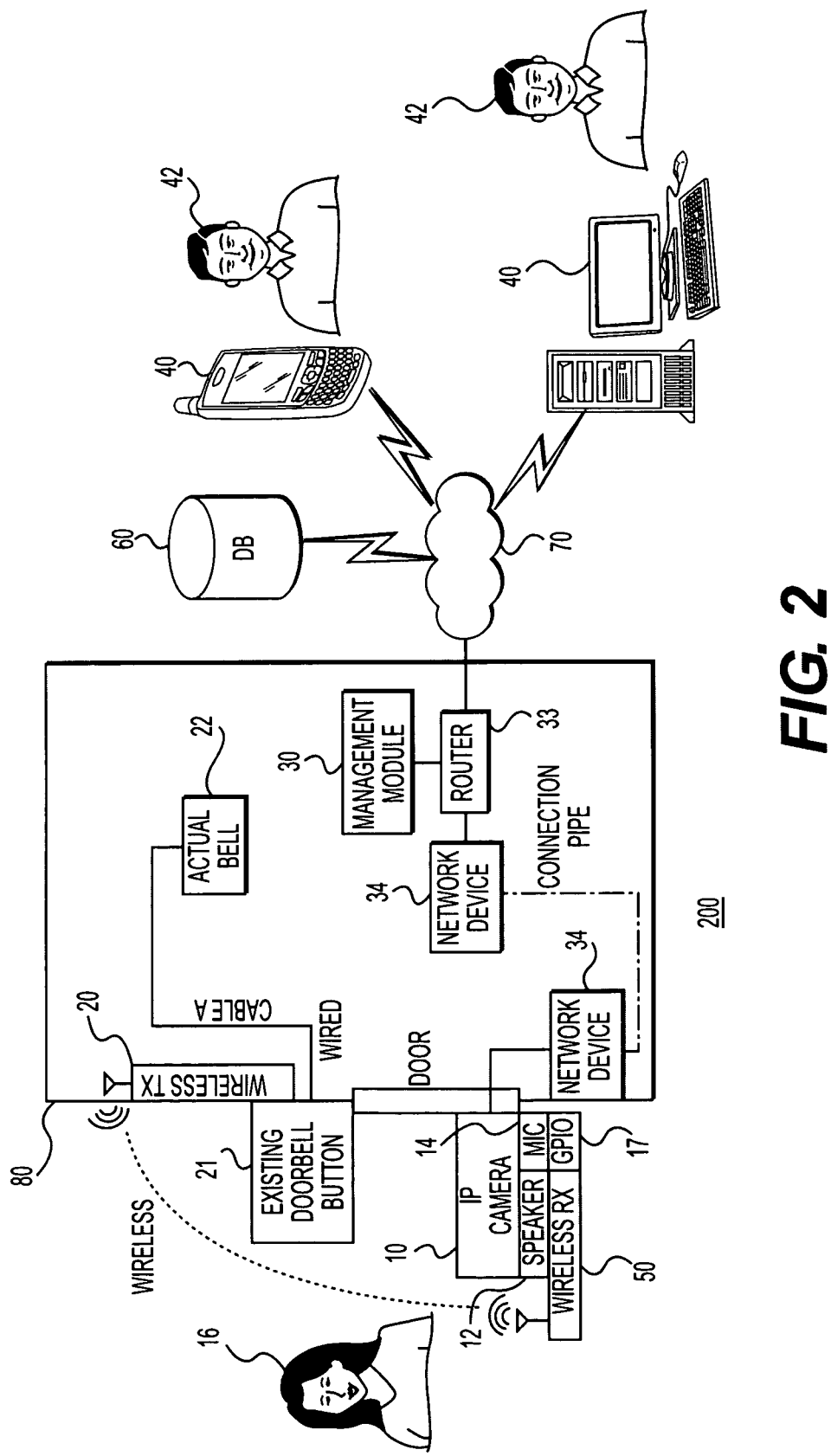
FIG. 2 is a schematic view of a security system in accordance with a second embodiment of the presently disclosed and claimed inventive concept(s)

FIG. 2 illustrates another embodiment of a security system 200. The difference between the security system 200 and the security system 100 is that the sensor 20, which includes in this embodiment a wireless transmitter, is connected in parallel to a 2-wire conductor or cable at the bell button 21. The sensor 20 is triggered by the shorting of the 2-conductor wire or cable, when the doorbell button 21 is pressed. As such, a triggering event in response to which the sensor 20 generates a signal is the doorbell button 21 being pressed.

In addition, the sensor 20 of the security system 200 is tuned with a receiver module 50 (e.g. a wireless receiver) connected to the video camera 10, and more particularly to the GPIO relay input 17. It is equally feasible that the receiver module 50, the GPIO relay input 17, and the video camera are embedded in a common unit. When the sensor 20 generates a signal in response to a triggering event, the signal is received by the receiver module 50 which in turn causes the video camera 50 to take an image snapshot of its field of view. The image snapshot is sent to the management unit 30 which reacts by initiating a communication between the remote communication device 40 and the video camera 10 in a similar manner than the communication initiated by the security system 100 described above.

Figure 3:
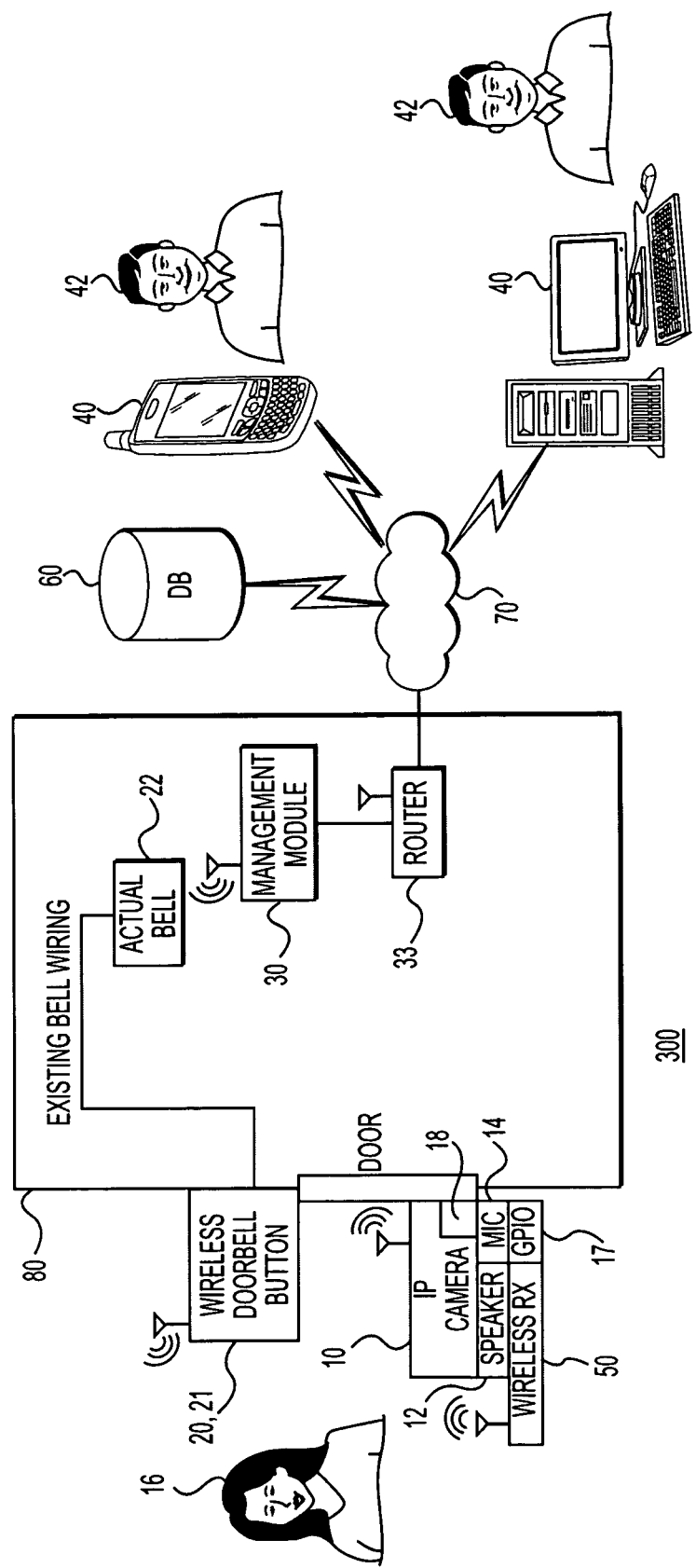
FIG. 3 is a schematic view of a security system in accordance with a third embodiment of the presently disclosed and claimed inventive concept(s)

FIG. 3 illustrates another embodiment of a security system 300. The doorbell button 21 of the security system 300 is connected by a wire to the bell unit 22. In this embodiment, the doorbell button 21 is the sensor 20 and generates a wireless signal when actuated.

As in the security system 200, the doorbell button/sensor 20, 21 of the security system 300 is tuned with a receiver module 50 (e.g. a wireless receiver) connected to the video camera 10, and more particularly to the GPIO relay input 17 built into the video camera 10.

The video camera 10 includes a motion detection module 18 for motion detection and proximity detection configured to pick up movements in a vicinity of the video camera 10. When movement occurs beyond a configured motion threshold, the video camera 10 is triggered to initiate a communication between the remote communication device 40 and the video camera 10 in a manner similar to the communication initiated by the security system 100. In this embodiment, the video camera 10 providing the motion detection module 18 acts as a sensor.

The video camera 10 of the security system 300 communicates with the management module 30 wirelessly and no connection pipe including network devices (referred to as network devices 34 in the security system 100) is required.

In the security system 300, a triggering event causing the management module 30 to initiate a connection between the remote communication device 40 and the video camera 10 is either actuation of the doorbell button/sensor 20, 21 or motion and/or proximity detection by the motion detection module 18 of the video camera 10. The user 42 can change the configuration of the triggering event (in order to define the triggering event as being actuation of the doorbell button/sensor 20, 21 and/or motion and/or proximity detection) by logging into a web page that communicates with the management module 30.

Figure 4:
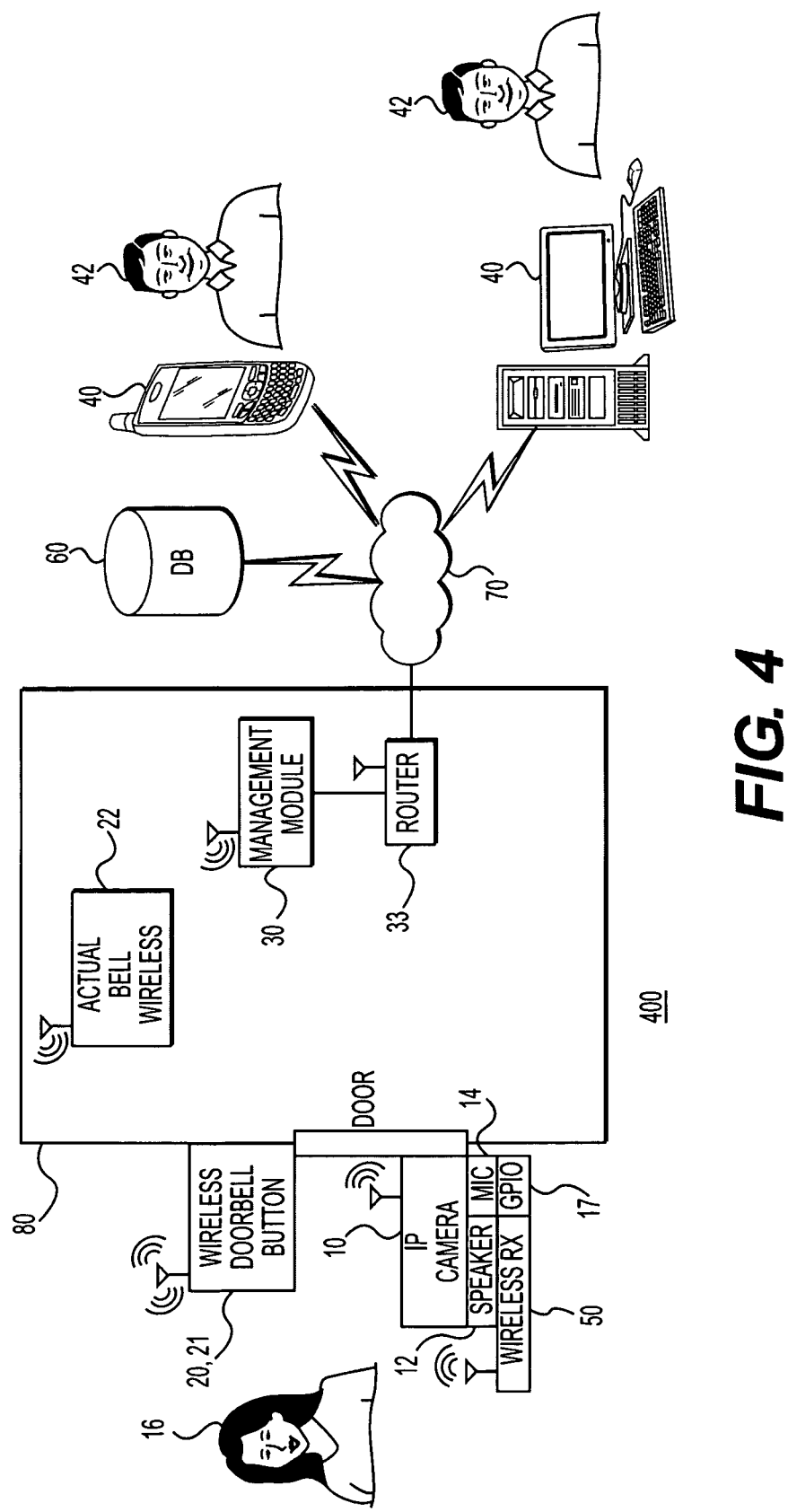
FIG. 4 is a schematic view of a security system in accordance with a fourth embodiment of the presently disclosed and claimed inventive concept(s)

FIG. 4 illustrates another embodiment of a security system 400. The difference between the security system 400 and the security system 300 is that the doorbell button/sensor 20, 21 is connected to a wireless bell unit 22 wirelessly. The security system 400 operates in a manner similar to the security system 300.

Figure 5:
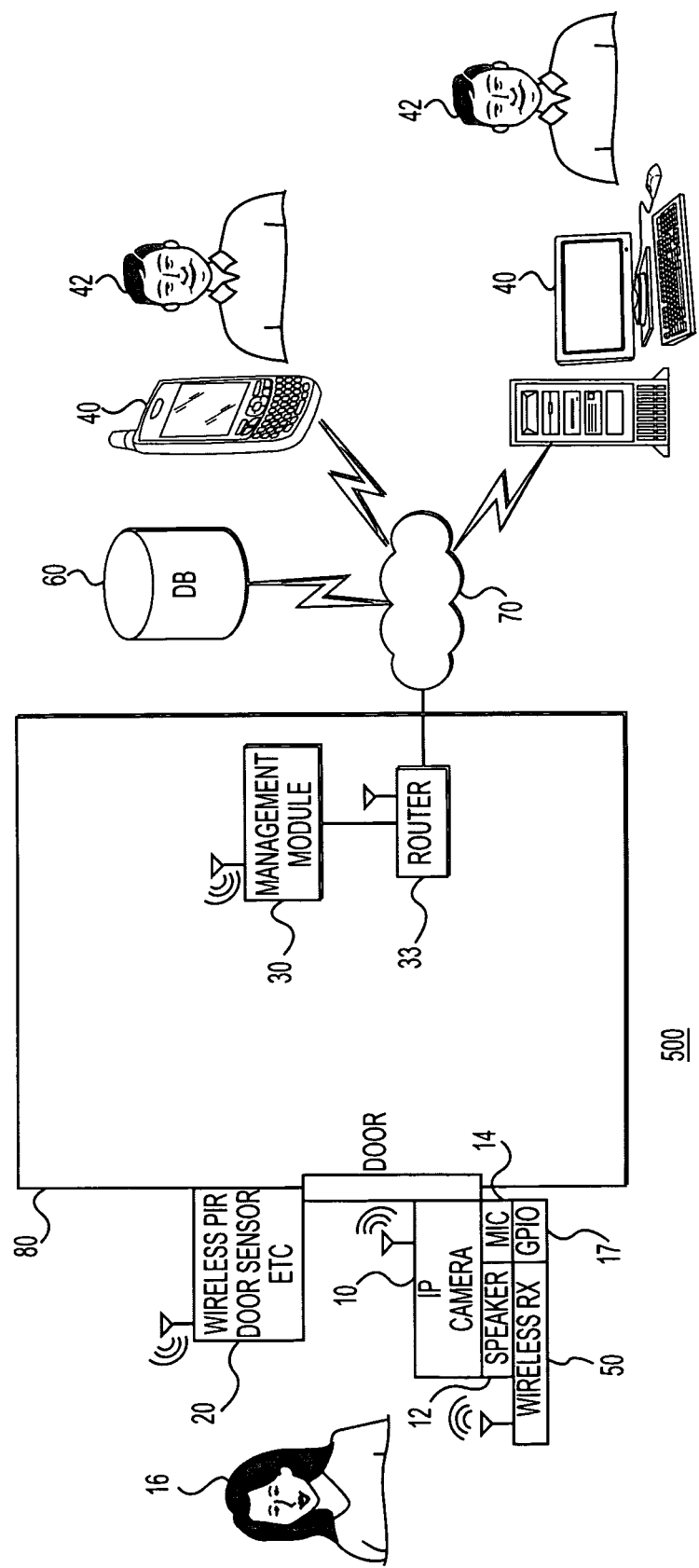
FIG. 5 is a schematic view of a security system in accordance with a fifth embodiment of the presently disclosed and claimed inventive concept(s)

FIG. 5 illustrates another embodiment of a security system 500. The difference between the security system 500 and the security system 400 is that the doorbell button is replaced by another type of sensor 20. The sensor 20 can be wireless or not. The sensor 20 can be part or not of the video camera 10. The sensor 20 can be, for example, a Passive Infra Red (PIR) motion detector, door contacts (detecting door opening), a sound detector (detecting a cry of a baby or a cry of a pet), a motion detector, a proximity detector and an infrared (IR) beam sensor. The sensor 20 generates a signal in response to a triggering event, the signal is then received by the receiver module 50 of the video camera 10 which in turn causes the video camera 10 to take an image snapshot and/or initiate a two-way communication in a manner similar to the communication initiated by the security system 100.

Figure 6:
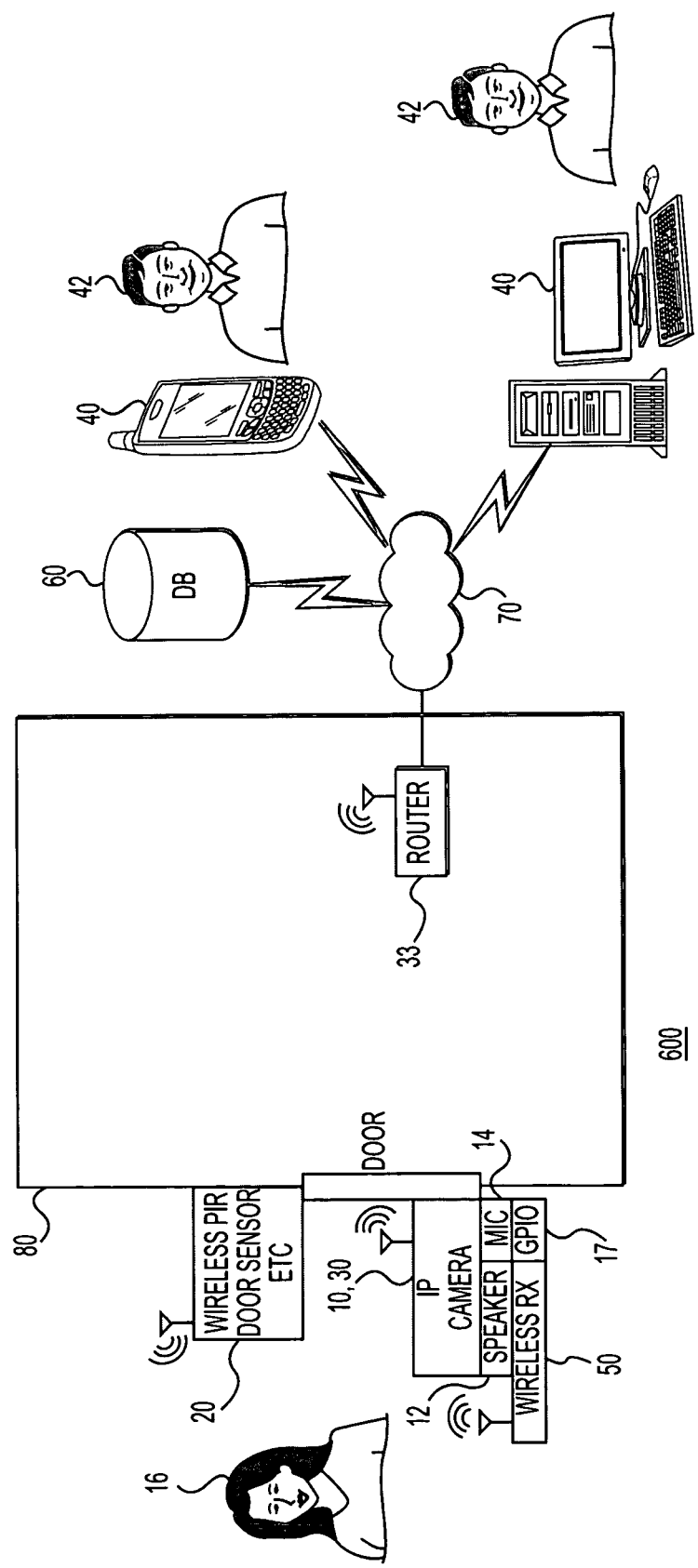
FIG. 6 is a schematic view of a security system in accordance with a sixth embodiment of the presently disclosed and claimed inventive concept(s).

FIG. 6 illustrates another embodiment of a security system 600. The difference between the security system 600 and the security system 500 is that the video camera 10, 30 includes the management module 30. As such, management functions required to operate the security system 600 are implemented in and carried out by the video camera 10, 30. It is contemplated that the management module 30 can be embedded as a module of the video camera 10 or fully integrated with the video camera 10.

In addition, the security system 600 may include several video cameras 10, 30, each one of the video cameras 10, 30 including its own management module 30. This configuration provides a fail-save mechanism should the management module 30 of one of the video cameras 10, 30 go down. In such a case, the management module 30 of one of the remaining video cameras 10, 30 can take over the management functions required to operate the security system 600.

In addition to the functionalities explained above, it is contemplated that the security systems 100, 200, 300, 400, 500, and 600 described above could be provided with the features described below. It is contemplated that these features could be offered, for example, via a web interface which connects to the management module 30 (directly or indirectly).

Through the Internet, the user 42 can request an image snapshot from the video camera 10, a live audio or video session with the video camera 42, an audio or video recording, a two-way communication initiated by the video camera 10 to a remote communication device of the user's choosing as well as view archived images, for example located in the database 60.

The user 42 can also change the configuration of the management module 30, modify the triggering event causing the doorbell button/sensor 20 to generate a signal, access data related to actions undertaken by the management module 30 (e.g. view system logs such as when snapshots were taken, when conversations took place, when the system was armed/disarmed).

The user 42 can also arm or disarm the alarm panel 32, for example by issuing a suitable command to the management unit 30, which in turn issues a suitable command to the alarm panel 32.

The user 42 can also request a message to be played, for example on the speaker and/or on the monitor of the video camera 10. The message can be, for example, played in response to the generation of a signal by the doorbell button/sensor 20.

The user 42 can also initiate a live audio or video session with the video camera 10 regardless of a triggering event.

The user 42 can also lock and unlock a door of the building or house 80 remotely. For example, the user 42 can send instructions with the remote communication device 40 to the management module 30 that in turn causes an actuator connected to a locking mechanism of the door to lock or unlock the door.

Other potential triggering events to initiate the call are also contemplated, such as motion detection, infra-red beam interruption, proximity sensors or other suitable technologies that can trip the GPIO relay input 17 of the video camera 10.

It is also contemplated that a GPIO relay input on the management module 30 could replace the GPIO relay input 17 on the video camera 10 in order to initiate a communication to the remote communication device 40 upon receipt of the signal generated by the sensor in response to the triggering event.

Although some embodiments of the presently disclosed and claimed inventive concept(s) recite one video camera, it is also contemplated that several video cameras and/or sensors can be implemented as part of the security system and that the management module 30 can handle one or more video camera and/or one or more sensors. The one or more video cameras and/or the one or more sensors can be disposed at multiple locations of the building or house 80, including at the interior and/or at the exterior of the building or house 80. Several video cameras and/or sensors can be managed by one or more management modules 30 and can be triggered independently and/or at the same time.

It is also contemplated that the video camera and/or the sensor can be disposed at various location of the building or house 80, including at the interior and/or at the exterior of the building or house 80.

It is also contemplated that the security systems 100, 200, 300, 400, 500, and 600 can be used as a nanny camera, for example by using the sensor and/or video camera to trigger upon a cry of a baby and/or motion of the baby and/or an entry of a person in a room of the baby.

It is also contemplated that the security systems 100, 200, 300, 400, 500, and 600 can be used as a pet camera, for example by using the sensor and/or video camera to trigger upon a cry of a pet and/or motion of the pet.

It is also contemplated that different parts of the system could be integrated into a single unit, or that single units could be broken down into further specialized sub-units that accomplish the same tasks.

It will be appreciated that, in some embodiments of the presently disclosed and claimed inventive concept(s), certain functionality of a given component described herein (including the motion detection module 18, the management module 30, the alarm panel 32, the receiver module 50 or part thereof) may be implemented as pre-programmed hardware or firmware elements (e.g., application specific integrated circuits (ASICs), electrically erasable programmable read-only memories (EEPROMs), etc.) or other related elements. In other embodiments of the presently disclosed and claimed inventive concept(s), a given component described herein (including the motion detection module 18, the management module 30, the alarm panel 32, the receiver module 50 or part thereof) may comprise a processor having access to a code memory which stores program code (instructions) for operation of the processor to implement functionality of that given component. The program code may be stored on a medium which is fixed, tangible, and readable directly by the given component (e.g., removable diskette, CD-ROM, ROM, fixed disk, USB key, etc.). Alternatively, the program code may be stored remotely but transmittable to the given component via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

Modifications and improvements to the above-described embodiments of the presently disclosed and claimed inventive concept(s) may become apparent to those skilled in the art. The foregoing description is intended to be exemplary rather than limiting. The scope of the presently disclosed and claimed inventive concept(s) is therefore intended to be limited solely by the scope of the appended claims.

What is claimed is:

1. A security system comprising:
   a camera;
   a sensor generating a signal in response to a selectable triggering event, selected from a group consisting of an actuation of a doorbell button, an actuation of a bell connected to and operated by a doorbell button, door opening detection, sound detection, motion detection, proximity detection and infrared (IR) beam interruption; and
   a management module adapted to:
      send data to be received by at least one remote communication device upon generation by the sensor of the signal generated in response to the triggering event, and
      initiate a two-way connection between the at least one remote communication device and the camera, the two-way connection permitting data exchange between a user of the at least one remote communication device and a person located in the vicinity of the camera,
   wherein the signal generated by the sensor in response to the triggering event is transmitted to at least one of the management module and the camera wirelessly; and
   wherein the management module is modifiable by the user via at least one of a web interface and a cellular telephone interface.

2. The security system of claim 1, wherein the camera and the sensor are a common device providing a motion detection module, the motion detection module triggering motion detection and proximity detection.

3. The security system of claim 1, wherein the data sent by the management module includes data generated by the camera.

4. The security system of claim 1, wherein the at least one remote communication device includes a first remote communication device receiving the data sent by the management module upon generation by the sensor of the signal generated in response to the triggering event and a second remote communication device with which the connection permitting data exchange with the camera is initiated, the second remote communication device being different from the first remote communication device.

5. The security system of claim 1, wherein the sensor is a doorbell button.

6. The security system of claim 1, further comprising a receiver module which causes the camera to generate data related to an image of a vicinity of the camera taken by the camera in response to receiving the signal generated by the sensor.

7. The security system of claim 6, wherein the receiver module and the camera are embedded in a common unit.

8. The security system of claim 1, wherein the data sent by the management module is related to an image of a vicinity of the camera taken by the camera.

9. The security system of claim 1, wherein the camera is a video camera and includes a microphone and a speaker.

10. The security system of claim 9, wherein the connection initiated between the at least one remote communication device and the video camera allows a user of the at least one remote communication device to communicate with a person who is located in a vicinity of the video camera.

11. The security system of claim 10, wherein the video camera is located at one of a building and a house and the user of the at least one remote communication device is remote from the one of the building and the house.

12. The security system of claim 1, wherein the management module is further adapted to store in a database data related to an image of a vicinity of the camera taken by the camera upon receipt of the signal from the sensor.

13. The security system of claim 1, wherein the at least one remote communication device is at least one of a fixed line telephone, a cellular telephone, a smart phone, and a computer.

14. The security system of claim 1, wherein the management module initiates the connection between the at least one remote communication device and the camera via at least one of Internet and a Voice over Internet Protocol (VoIP) call.

15. The security system of claim 1, wherein the management module initiates the connection between the at least one remote communication device and the camera by dialling at least one pre-determined phone number.

16. The security system of claim 1, wherein the web interface allows at least one of changing a configuration of the management module, modifying the triggering event, requesting a live video session with the camera, requesting a live audio session with the camera, recording audio session with the camera, recording video session with the camera, accessing an image of a vicinity of the camera taken by the camera, arming an alarm control unit, disarming an alarm control unit, requesting a message to be played and accessing data related to actions undertaken by the management module.

17. The security system of claim 1, wherein the camera includes the management module.

18. A doorbell system comprising:
a camera;
a doorbell button;
a bell operated by the doorbell button;
a sensor generating a signal in response to a selectable triggering event, selected from a group consisting of the doorbell button and the bell; and
a management module adapted to:
send data to be received by at least one remote communication device upon generation by the sensor of the signal generated in response to actuation of at least one of the doorbell button and the bell, and
initiate a two-way connection between the at least one remote communication device and the camera, the two-way connection permitting data exchange between a user of the at least one remote communication device and a person located in the vicinity of the camera,
wherein the signal generated by the sensor in response to the triggering event is transmitted to at least one of the management module and the camera wirelessly; and
wherein the management module is modifiable by the user via at least one of a web interface and a cellular telephone interface.

* * * * *